March 29, 1938.　　　R. J. KEMP ET AL　　　2,112,726
GLARE SCREEN
Filed July 23, 1936　　　2 Sheets-Sheet 1
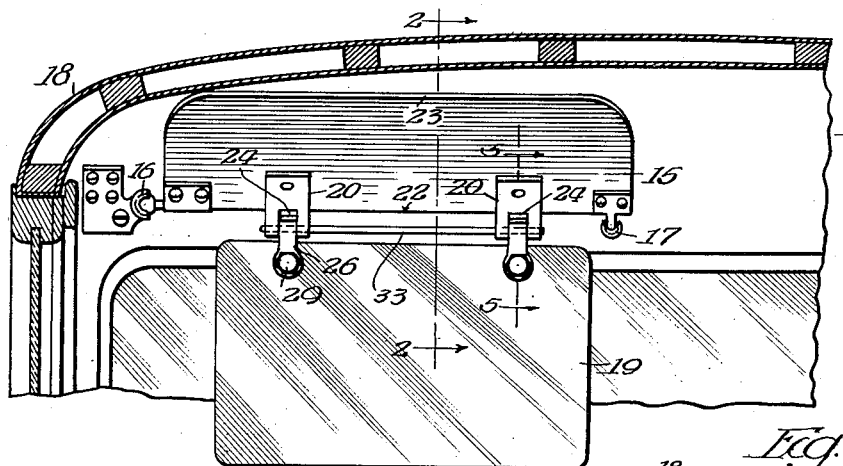
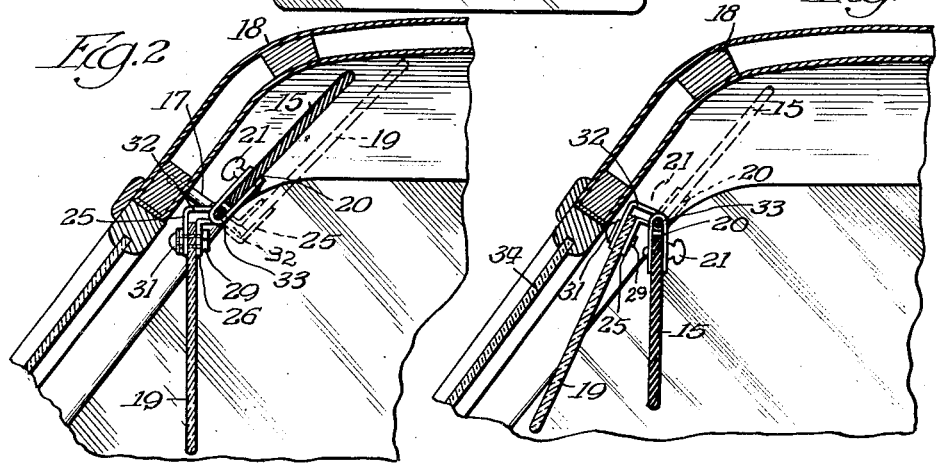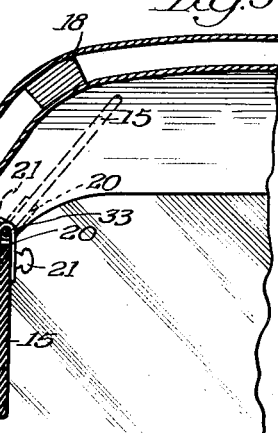
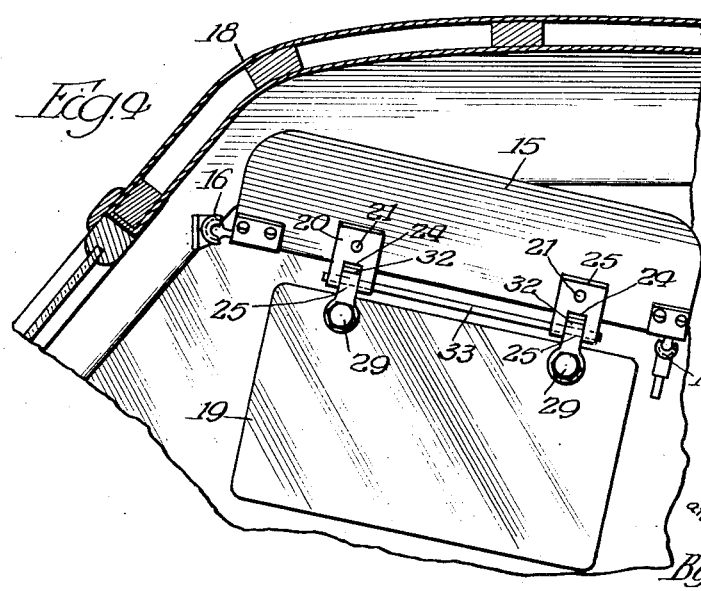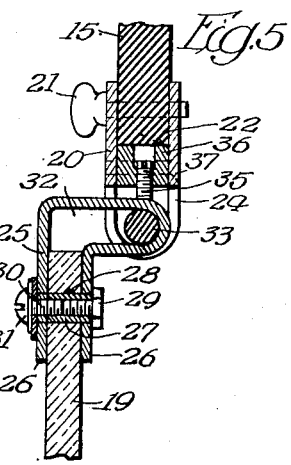
Inventors
Robert J. Kemp
and Milton H. Kemp

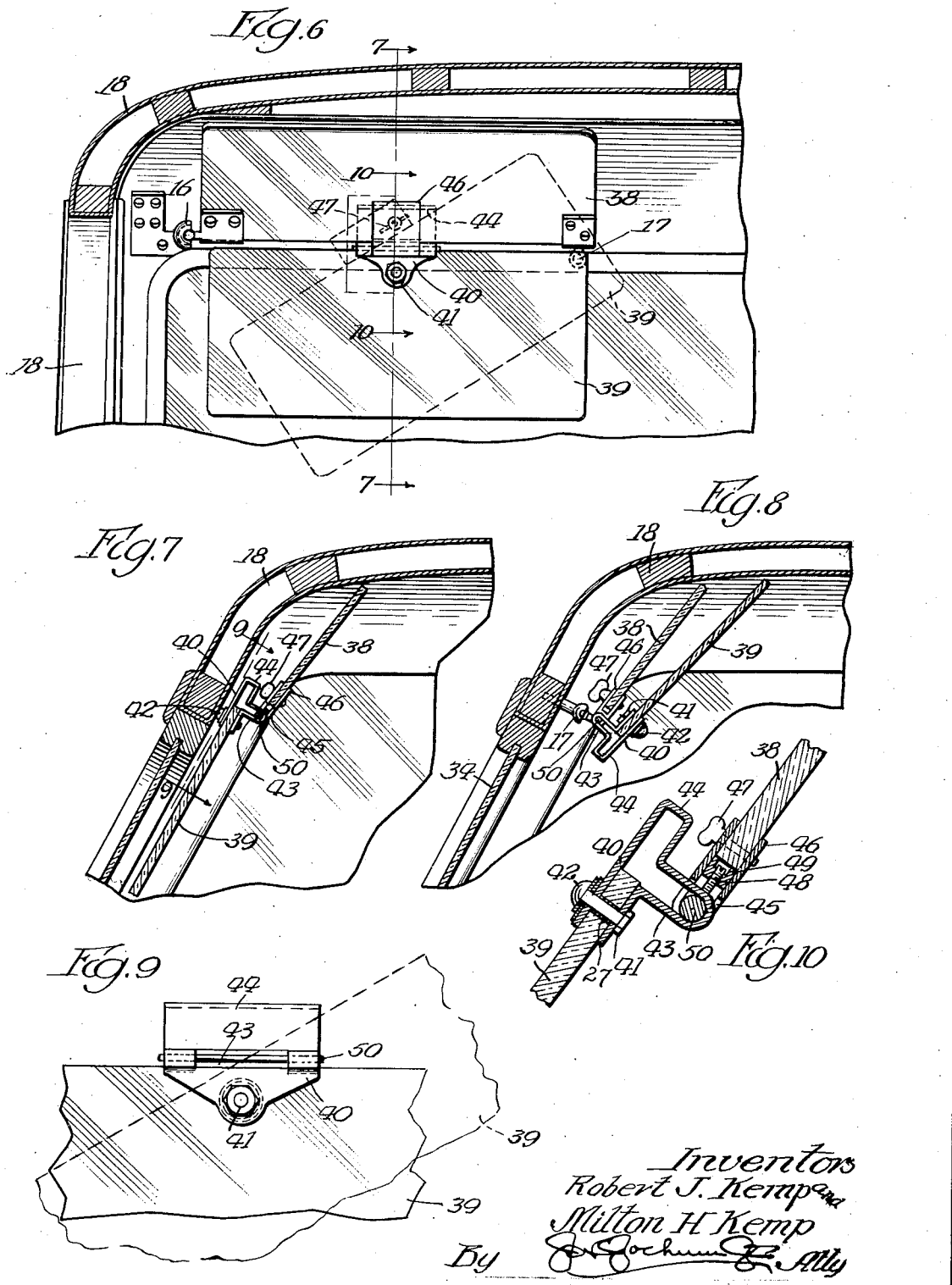

Patented Mar. 29, 1938

2,112,726

UNITED STATES PATENT OFFICE 2,112,726

GLARE SCREEN

Robert J. Kemp, Chicago, and Milton H. Kemp, Oak Park, Ill.

Application July 23, 1936, Serial No. 92,108

20 Claims. (Cl. 296—97)

This invention relates to improvements in glare screens, particularly adapted, though not necessarily limited in its use, with automobiles, and one of the objects of the invention is to provide an improved screen of this character adapted for use in combination with a visor, and which is installed at the rear of the windshield, the screen serving not only to protect the driver from the direct rays of the sun, due to the angle of elevation, but also against headlights and diffused or reflected rays.

A further object is to provide an improved combined, opaque visor and transparent glare shield or screen, so constructed and assembled that either may be employed or positioned for use independently of the other.

To that end the glare screen and visor constitute separate elements which are hingedly connected together along one edge so that the screen and visor may, at the will of the operator, be folded together and positioned adjacent the top of the automobile.

The screen may be formed of any suitable transparent or translucent material having the desired glare reducing qualities, but it is preferable to employ glass of the type commonly known to the trade as "safety" or "shatter-proof" glass, in which the glass itself or the binding material possesses the glare reducing properties.

A further object is to provide an improved glare screen which is adapted to be secured to the visor preferably at that edge which is pivotally connected to its support, so that when the visor is swung into an inoperative position, the screen may be swung down into a position for use.

A further object of the invention is to provide an improved glare screen of this character which may be supplied as an attachment to visors which are already installed, or as a permanent structure with the visor, so that the two may be supplied as a unitary structure or standard equipment.

A further object is to provide an improved glare screen which is attached to a visor, either one or both of which may be formed of transparent or translucent material, the two being connected in such a manner that the screen may be tilted when in a substantially vertical position, to afford a clear or unobstructed view or vision of the edge of the road, beneath the screen or between the screen and visor, while at the same time the screen will shield the eyes of the driver.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a view partly in elevation and partly in section of a portion of an automobile having a glare screen constructed in accordance with the principles of this invention attached to the visor installed in the automobile.

Figure 2 is a detail, vertical, sectional view taken on line 2—2, Figure 1.

Figure 3 is a view similar to Figure 2, showing the parts in different positions.

Figure 4 is a side elevation, showing the glare screen attached to the visor and with the visor in a partially detached position, adapting the same to be swung into another position in the automobile.

Figure 5 is a detail sectional view, on an enlarged scale, taken on line 5—5, Figure 1.

Figure 6 is a view similar to Figure 1 of another form of the invention, showing the parts in solid lines in one position and in dotted lines in another position.

Figure 7 is a detail sectional view taken on line 7—7, Figure 6.

Figure 8 is a view similar to Figure 7, showing the parts in a different position.

Figure 9 is a detailed elevation taken on line 9—9, Figure 7.

Figure 10 is a detail sectional view, on an enlarged scale, taken on line 10—10, Figure 6.

Referring more particularly to the drawings and to the form of the invention shown in Figures 1 to 5, the numeral 15 designates a visor which is pivotally mounted as at 16 by means of a ball and socket joint, and is provided with a plug 17 hinged to the other end, and which plug is adapted to be inserted in sockets in the automobile frame 18, the ball and socket joint adapting the visor to be bodily swung into different positions. The ball and socket joint 16 and jointed connection of the plug 17 with the visor 15 permit of the desired swinging and adjustable movements of the visor.

All of these parts are of the ordinary and well known construction.

The numeral 19 designates a glare screen which may be constructed of any suitable transparent or translucent material, but is preferably constructed of glass of such a nature as to protect the eyes of the driver from direct or fused light rays.

This screen is of a substantial thickness and is preferably of a width slightly greater than the width of the visor 15, so that when the screen and visor are both moved to the position shown in Figure 3, that is in positions in front of the eyes of the driver, a portion of the screen will project below the lower edge of the visor. Obviously, however, the screen may be of any desired width with respect to the visor.

The numeral 20 designates generally clip members formed of any suitable material of substantial rigidity, and these clip members are secured to the edge of the visor 15 in any suitable manner preferably by means of thumb screws 21 which may be of a suitable length to pass entirely through the jaws of the clip 20 and through the visor 15, or may be of such a length as to impinge one face of the visor and to cooperate with the other jaw to frictionally secure the clip to the edge of the visor.

The clips are secured to the edge 22 of the visor which is that edge upon which the visor swings as a pivot, that is the anchored edge of the visor, the other edge 23 of the visor being adapted to swing freely about its pivot and being held in position in any suitable manner, preferably by means of the usual friction creating devices employed with visors of this character.

The clip members 20 project beyond the edge 22 of the visor and the projecting portions are bifurcated as at 24, for a purpose to be set forth.

To the screen 19 and at one edge thereof a suitable number of clips 25 are secured, one clip 25 being provided for each of the clips 20. The clips 25 are constructed of suitable substantially rigid material and are provided with spaced jaws 26 between which the edge of the screen 19 is inserted. The screen and clips are secured together in any suitable manner, but a simple and efficient means consists of a tubular member 27 constructed of any suitable material which is seated within an aperture 28 in the screen. A screw 29 passes through one of the jaws of the clip and is threaded into the tubular member 28, and a screw 30 passes through the other jaw of the clip 25 and is also threaded into the tubular member 27 so as to clamp the jaws of the clip against the screen and at the same time prevent crushing or injuring the screen. The head 31 of the screw 30 is of a substantial size and projects for a substantial distance beyond the outer face of the respective jaw 26 of the clip 25, for a purpose to be set forth.

The clip is provided with a portion 32 which is preferably arranged at substantially right angles to the jaws 26 and projects for a substantial distance beyond one face of the jaws. This portion 32 projects into the bifurcated portion 24 of the clip 20, and a rod 33 or pintle member extends through the portion 32 of the clips 25 and also through the walls of the bifurcated portion 24 of the clip 20 to form a hinge about which the screen 19 is adapted to be swung with respect to the visor 15. This rod or pintle member 33 is held against longitudinal displacement in any suitable manner.

It will therefore be seen that the screen 19 will be supported by the visor 15 and is adapted to be moved about the pivot formed by the pintle member or rod 33 to be folded and unfolded with respect to the visor 15, the offset portion 32 of the clips 25 serving to permit the screen to be folded compactly with respect to the visor, as shown more particularly in Figures 2 and 3.

It will be noted that the head 31 of the screw 30 is arranged on that side of the screen 19 which is adjacent the windshield 34 of the automobile, and is disposed in a position that it will contact or abut a portion of the frame of the windshield so as to limit the movement of the screen 19 towards the windshield to prevent the screen from being forced into contact with the windshield and thereby prevent injury to either or both of them.

Any suitable means may be provided for creating friction to maintain the screen 19 in its adjusted position with respect to the visor 15. A suitable and efficient means, however, consists of a screw 35 threaded into a block or member 36 disposed within the clip 20, the member 36 being held in position in any suitable manner, such as by means of a screw 37. By adjusting the screw 35 in a direction transverse to the axis of the bar or pintle member 33, it will be manifest that friction will be created upon the clip 25 by the engagement of the screw 35 therewith, and this friction may be regulated by adjusting the screw.

The thumb nuts 21 are preferably disposed on that side of the visor 15 which is adjacent the windshield of the automobile, when the visor is swung into a position out of use, as shown more clearly in Figure 2.

In the form of the invention shown in Figures 6 to 10, the visor 38 is constructed of translucent or transparent material and is supported in a manner similar to the visor shown in Figure 1. The screen 39 is also constructed of transparent or translucent material and has secured to one edge thereof and preferably midway of the length of the screen a clip 40, between the jaws of which one edge of the screen is inserted and the parts are held together preferably in a manner somewhat similar to that shown in Figure 5, by means of screws 41 and 42, the head of the screw 42 being enlarged, similar to the head 31 of the screw 30 so as to form an abutment or stop for the swinging movement of the screen 39 toward the windshield 34.

The clip 40 is provided with a laterally projecting offset portion 43 and an upwardly projecting portion 44, the latter being in alinement with the space between the jaws of the clip. The laterally projecting portion 43 of the clip projects into a bifurcation 45 in another clip 46, which latter is secured to the edge of the visor 38, preferably by means of a thumb screw 47.

A similar friction creating screw 48 passing through a member 49 in the clip 46, may also be provided for producing the necessary friction between the screen 39 and the visor 38 to maintain these two parts in their relatively adjusted position.

Only one of the clips 40 is provided and the clip is secured to the visor 38 preferably midway of the length thereof and preferably to that edge of the visor upon which the visor swings as a pivot.

The offset portion 43 of the clip 40 will permit the screen 39 to fold substantially flat against the visor 38 as shown more clearly in Figure 8, and the head of the screw 42 forms a stop adapted to abut a portion of the windshield to limit the forward movement of the screen.

In use, the desired friction is obtained by adjusting the screw 48 and also by adjusting the screws 41 and 42.

With this form of the invention and by reason of the pivot formed between the clip 40 and the screen 39, and the pivot formed by a pin or pintle member 50 which passes through the laterally projecting portion 43 of the clip 40, and the walls of the bifurcated portion 45 of the clip 46, a substantially universal joint will be produced between the screen and the visor, adapting the screen for movements in different directions and planes with respect to the visor.

By reason of the pivot formed between the clip 40 and the screen 39 it will be manifest that the screen 39 may be swung about its pivot in directions to tilt the screen 39 edgewise or upon its longitudinal axis so as to permit a portion of the lower edge of the screen to be raised and the screen positioned as shown in dotted lines in Figure 6, with respect to the visor. This will permit the driver to have a clear vision or unobstructed view of the right hand edge of the road, while the screen is in position for use, and while at the same time the eyes of the driver will be protected, it will also permit the driver to have a vision between the screen and the visor, if desired, toward the middle of the road.

With this improved construction it will be manifest that either the screen or the visor may be swung down into position for use or moved into an inoperative position and when the visor is moved into a position out of line of vision of the driver and towards the roof of the car, the screen may be lowered in position. When it is desired to use the visor, it may be swung down into position in front of the screen.

Obviously, and where the visor and screen are both constructed of transparent or translucent material, they may be constructed in such a manner and of such material that they will cooperate with each other in such a manner as not to obstruct the vision of the driver therethrough.

While in both forms of the present exemplification of the invention the screen and visor have been shown as being constructed of separate elements detachably secured together, so as to permit the screen to be secured to visors which are already installed, it is to be understood that the screen and visor may be constructed as a unitary structure. That is, they may be constructed in such a manner as to constitute standard equipment and may be installed in a machine as permanently connected elements and standard equipment.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. In a glare screen mechanism the combination of a visor pivotally mounted to swing into and out of position for use with respect to a windshield, a screen, means pivotally connecting said screen to that edge of said visor upon which the latter swings as a pivot and intermediate the ends of said edge, whereby the screen may be folded and unfolded with respect to the visor, and the screen may be swung into position for use independently of and when the visor is swung out of position for use, said screen adapted to assume a position for use, between the visor and the windshield.

2. In a glare screen mechanism the combination of a visor pivotally mounted to swing into and out of position for use with respect to a windshield, a screen, means for detachably and pivotally connecting said screen to that edge of said visor upon which the latter swings as a pivot, the said means being disposed within the confines of and spaced from the ends of said edge, the screen to be folded and unfolded with respect to the visor, and whereby the screen may be swung into position for use independently of and when the visor is swung out of position for use said screen also adapted to be positioned between the visor and the windshield.

3. In a glare screen mechanism, the combination of a visor pivotally mounted to swing from vertical to horizontal positions, a screen, a plurality of clips pivotally connected to one edge of said screen and adapted to engage that edge of the visor upon which the latter swings, and anchoring means adjustable with respect to said clips for detachably securing the clips to said visor.

4. In a glare screen mechanism, the combination of a visor pivotally mounted to swing from vertical to horizontal positions, a screen, a plurality of clips pivotally connected to one edge of said screen and adapted to engage that edge of the visor upon which the latter swings, anchoring means adjustable with respect to said clips for detachably securing the clips to said visor, and friction creating means cooperating with the pivot between the screen and visor, for maintaining the former in adjusted position with respect to the latter.

5. In a glare screen mechanism the combination of a visor pivotally mounted to swing into and out of position for use, a screen, means pivotally connecting said screen to that edge of the visor upon which the latter swings as a pivot and intermediate the ends of said edge, whereby both the screen and the visor may be folded and unfolded one with respect to the other, and the screen may be swung into position for use independently of and when the visor is swung out of position for use, said screen being adapted to assume a position on that side of the visor which is away from the driver and being of such a width that when folded with respect to the visor and the visor is in position for use, a portion of the screen will project for a substantial distance beyond the lower edge of the visor.

6. In a glare screen mechanism, a visor and a screen, pivotally supported by adjacent edges, the said adjacent edges being each mounted to swing about independent pivots, said visor and screen each being adapted to be moved about their pivots into and out of position for use and to be folded one against the other, one being adapted to be moved into an inoperative position when the other is moved into an operative position, both said visor and screen being formed of transparent material, and means individual to the screen and visor for yieldingly maintaining them in their adjusted position.

7. In a glare screen mechanism the combination of a visor pivotally mounted to swing into and out of position for use, a glare screen, means pivotally connecting said screen to the visor adjacent that edge of said visor upon which the latter swings as a pivot, whereby the screen may be folded and unfolded with respect to the visor, and the screen may be swung into position for use when the visor is swung out of position for use, said screen adapted to assume a position between the said visor and the windshield, and means serving as a stop, for limiting the movement of said screen towards said windshield.

8. In a glare screen mechanism, a visor, means pivotally mounting the visor to swing into a horizontal position out of use or into a vertical position, a screen, and means connecting the screen to that edge of the visor on which the latter swings as a pivot, the last said means embodying a pivot axis of which latter is transverse to the axis of the first said pivot, adapting said screen to swing in a plane substantially parallel with the plane of and with respect to the visor, whereby a clear vision space may be obtained between adjacent edges of the visor and screen when the visor is swung into position out of use.

9. In a glare screen mechanism, a visor, means pivotally mounting the visor to swing into a vertical or horizontal position, a screen, and a universal joint connection between the screen and that edge of the visor about which the visor swings, for supporting the screen and for adapting the screen for movement with and with respect to the visor in a plurality of different planes.

10. In a glare screen mechanism, a visor, a screen, means pivotally supporting the visor for movements into and out of a horizontal and vertical position, and means supporting the screen from the pivotally mounted edge of the visor for movements into and out of vertical and horizontal positions, the last said means providing a pivot adapting said screen for an endwise tilting movement with respect to the visor.

11. A glare screen embodying a visor pivotally mounted by one of its edges, a screen proper having one of its edges in close proximity to the pivotally mounted edge of the visor, and means pivotally mounting the screen upon the pivot edge of the visor, the axes of the pivots of said visor and screen being in close proximity to each other and substantially parallel, said visor and screen being adapted to assume positions in parallel planes in front of the driver's seat, and the screen adapted to be positioned on the side of the visor that is away from the driver, and each being movable into and out of their respective planes independently with respect to the other.

12. A glare screen embodying a visor pivotally mounted by one of its edges, a screen proper having one of its edges in close proximity to the pivotally mounted edge of the visor, means pivotally mounting the screen by said edge, the axes of the pivots of said visor and screen being in close proximity to each other and substantially parallel, said visor and screen being adapted to assume a position in a substantially common plane in front of the driver's seat, each being movable into and out of said plane independently with respect to the other, and means also adapting said screen to swing in a plane substantially parallel with the plane of and with respect to the visor.

13. A glare screen embodying a visor pivotally mounted by one of its edges, a screen proper having one of its edges in close proximity to the pivotally mounted edge of the visor, means pivotally mounting the screen by said edge, the axes of the pivots of said visor and screen being in close proximity to each other and substantially parallel, said visor and screen being adapted to assume positions in parallel planes in front of the driver's seat, each being movable into and out of their respective planes independently with respect to the other, and means also adapting said screen to swing in a plane substantially parallel with the plane of and with respect to the visor, the last said means embodying a pivotal connection between the screen and the visor, the axis of the last recited pivotal connection being disposed transverse to the axis of the first recited pivot of the screen.

14. In a glare screen mechanism, a visor and a screen, pivotally supported by adjacent edges, the said adjacent edges being mounted to swing about independent pivots, said visor and screen each being adapted to be moved about their pivots into and out of position for use and to be folded one against the other, one being adapted to be moved into an inoperative position when the other is moved into an operative position, and means individual to the screen and visor for maintaining them in their adjusted positions.

15. In a glare screen mechanism, a visor, a screen, means pivotally supporting the visor for movements into and out of a horizontal and vertical position, and means for supporting the screen from the pivotally mounted edge of the visor and on a pivot for movements into and out of vertical and horizontal positions, the last recited means embodying mechanism adapting said screen for endwise tilting movement with respect to the visor on a pivot, the axis of which is transverse to the axis of the last recited pivot.

16. In a glare screen, a support pivotally anchored at one end and releasably anchored at the other end, whereby said support may be moved about its first recited end on a substantially vertical pivot to be positioned substantially parallel with, or at substantial right angle to a wind shield, a glare screen, and a universal connection between said support and said screen for supporting the latter and adapting said screen for movement with respect to said support in a plurality of different planes, in either position of said support with respect to the wind shield.

17. In a glare screen mechanism, a visor, means pivotally mounting the visor to swing into a horizontal or vertical position, a screen, and a connection between the screen and visor for supporting the former, said connection embodying a pivot adapting said screen to swing into a plane substantially parallel with the plane of and with respect to the visor, said connection also embodying a second pivot, the axis of which latter is transverse to the axis of the first said pivot of said connection, the first said pivot adapting said visor and screen to be folded substantially flat one against the other.

18. In a glare screen mechanism, a visor, a screen, means pivotally supporting said visor by one of its edges, means pivotally supporting said screen by one of its edges, the pivotally mounted edges of said visor and screen being always maintained in fixed positions one with relation to the other, while their opposite edges are free and movable in directions toward and away from each other and about their respective pivots, into and out of position for use, and to be folded one against the other, one being adapted to be moved into an inoperative position when the other is moved into an operative position, and means individual to the screen and visor for maintaining them in their adjusted positions.

19. In a glare screen mechanism, a visor, a screen, means pivotally supporting said visor by one of its edges, means pivotally supporting said screen by one of its edges, the pivotally mounted edges of said visor and screen being always maintained in close proximity to each other, while their opposite edges are free and movable in directions toward and away from each other and about their respective pivots, into and out of position for use, and to be folded one against the other, one being adapted to be moved into an inoperative position when the other is moved into an operative position, and means individual to the screen and visor for maintaining them in their adjusted positions, the said means which pivotally supports said screen also embodying a second pivot the axis of which is transverse to the axis of the said pivot of the screen, adapting the said screen also for an endwise tilting movement with respect to said visor.

20. In a glare screen mechanism, the combination of a visor pivotally mounted to swing from vertical to horizontal position, a screen, means embodying a clamp pivotally connected to one edge of said screen and adapted to engage that edge of the visor upon which visor swings, anchoring means adjustable with respect to said clamp for detachably securing the said clamp to said visor, and friction creating means cooperating with the pivot between the screen and visor for maintaining the former in adjusted position with respect to the latter.

ROBERT J. KEMP.
MILTON H. KEMP.